United States Patent [19]
Porret et al.

[11] 3,725,342
[45] Apr. 3, 1973

[54] CURABLE COMPOSITION COMPRISING A DI-PRIMARY DIAMINE CONTAINING HYDANTOIN RINGS AND A POLYEPOXIDE COMPOUND

[75] Inventors: Daniel Porret, Binningen; Juergen Habermeier, Allschwil, both of Switzerland

[73] Assignee: Ciba-Geigy AG, Basel, Switzerland

[22] Filed: July 12, 1971

[21] Appl. No.: 161,911

Related U.S. Application Data

[62] Division of Ser. No. 876,037, Dec. 12, 1969.

[52] U.S. Cl.............260/2 N, 117/161 ZB, 161/184, 260/9, 260/13, 260/18 EP, 260/28, 260/30.4 EP, 260/30.6 R, 260/31.8 E, 260/32.8 EP, 260/33.2 EP, 260/33.6 EP, 260/37 EP, 260/47 EN, 260/59, 260/77.5 NC, 260/78.4 EP, 260/830 R, 260/831, 260/834
[51] Int. Cl...............................................C08g 30/14
[58] Field of Search.........260/309.5, 2 N, 47 EN, 59, 260/78.4 EP, 77.5 NC, 18 EP

[56] References Cited

UNITED STATES PATENTS 3,296,208   1/1967   Rogers.................260/67.5

FOREIGN PATENTS OR APPLICATIONS 572,090       3/1959   Canada
1,546,270   10/1968   France

OTHER PUBLICATIONS

Chem. Abst. 1963 Vol. 59 p. 11635 (1964)
Chem. Abst. Vol. 55 col. 17, 655 (1961)
Chem. Abst. Vol. 59 col. 3907–3908 (1963)
Chem. Soc. Japan, Pure Chem. Soc. Vol. 83 p. 318–323 (1962)

*Primary Examiner*—William H. Short
*Assistant Examiner*—T. Pertilla
*Attorney*—Harry Goldsmith et al.

[57] ABSTRACT

New bis-(1-γ-aminopropyl-hydantoinyl-3)-alkanes, for example 1,6-bis-(1'-(γ-aminopropyl)-5',5'-dimethyl-hydantoinyl-3')-hexane or β,β'-bis(1-(3'-aminopropyl)-5,5-dimethyl-hydantoinyl-3)-diethyl ether, and their use as curing agents in curable moulding, coating and adhesive compositions which contain a polyepoxide compound, for example a liquid polyglycidyl ether of bisphenol A. Curing can be carried out at relatively low temperatures, for example at '° C. The new type of curing agent bridges, in respect of its gradation of reactivity, a gap between aliphatic polyamines and cycloaliphatic polyamines. The new curing agents furthermore have the advantage relative to the aromatic polyamines of being non-toxic.

1 Claim, No Drawings

CURABLE COMPOSITION COMPRISING A DI-PRIMARY DIAMINE CONTAINING HYDANTOIN RINGS AND A POLYEPOXIDE COMPOUND

This is a division of application Ser. No. 876,037, filed Nov. 12, 1969.

It is known that epoxide resins can be cured by monobasic or polybasic aliphatic, cycloaliphatic or aromatic amines. Curing with aliphatic amines, such as diethylenetriamine, triethylenetetramine or hexamethylenediamine leads, even in the cold or at room temperature, to products having good mechanical properties which however do not always suffice for the highest requirements. The aliphatic polyamines are furthermore not physiologically harmless. The cycloaliphatic polyamines, such as diaminodicyclohexylmethane, are as a rule less toxic than the aliphatic polyamines but on the other hand cure more slowly, and at only moderately elevated cure temperatures (for example 40° C) it is in general not possible to achieve optimum properties of castings or coatings. Curable mixtures of epoxide resins and aromatic polyamines, such as phenylenediamine or 4,4'-diaminodiphenylmethane, can as a rule only be cured at higher temperatures to give industrially usable products. Furthermore the aromatic amines are more or less strongly toxic.

Thus the following sequence of reactivity applies to the main classes of amine curing agents known as curing agents for epoxide resins: aliphatic amines > cycloaliphatic amines > aromatic amines.

For practical requirements, a gap hitherto existed in the reactivity gradation between the aliphatic amines and the cycloaliphatic amines. It has now been found that by the use of certain di-primary diamines containing two heterocyclic nuclei, namely bis-(1-$\gamma$-aminopropylhydantoins).
which have hitherto not been described in the literature, it is possible to bridge this previous gap.

At only moderately elevated curing temperatures of 30° to 60° C these bis($\gamma$-aminopropylhydantoins) under conditions yield mouldings of improved mechanical properties, above all of better impact strength and elongation at break, than the aliphatic and cycloaliphatic polyamines which are known as curing agents. The physiologically harmless new bis($\gamma$-aminopropylhydantoins) are furthermore, for many applications, a fully equivalent replacement for the toxic aromatic amines hitherto usual as curing agents for these purposes.

Admittedly some types of amine curing agents for epoxide resins have already been proposed in the literature, in which one or more aminoalkyl groups are located on a heterocylic nucleus. Thus British Pat. Specification No. 869,484 describes mono-aminoalkyl-piperazines, such as aminoethylpiperazine, as curing agents for epoxide resins. This class of curing agents yields mouldings having good mechanical properties only at higher curing temperatures, whereas brittle, industrial unusable castings are obtained at curing temperatures of about 40° C.

French Pat. specification No. 1,399,171 and Austrian Pat. specification No. 250,024 further describe 3,4,5,6-tetrahydropyrimidine derivatives, which carry one or two $\gamma$-aminopropyl groups in the 3-position, as curing agents for epoxide resins. Under comparable curing conditions, these tetrahydropyrimidine derivatives however yield mouldings having lower impact strengths and elongations at break than the mouldings manufactured with the aid of the present $\gamma$-aminopropylhydantoins.

The subject of the present invention are thus new di-primary diamines containing two hydantoin rings, of formula

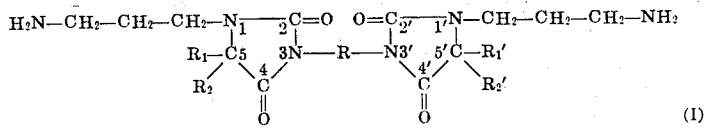

wherein R is an aliphatic, cycloaliphatic or araliphatic residue, preferably a saturated aliphatic hydrocarbon residue which is optionally interrupted by ether oxygen atoms, wherein $R_1$, $R_1'$, $R_2$ and $R_2'$ independently of one another each denote a hydrogen atom or an aliphatic or cycloaliphatic hydrocarbon residue, preferably a lower alkyl residue with one to four carbon atoms, or wherein $R_1$ and $R_2$ or $R_1'$ and $R_2'$ together form a divalent aliphatic hydrocarbon residue, preferably a tetramethylene or pentamethylene residue.

According to the invention, the new diamines of formula (I) can be manufactured by hydrogenating a bis-($\beta$-cyanoethyl-hydantoin) of formula

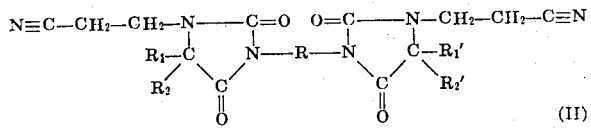

wherein the symbols R, $R_1$, $R_1'$, $R_2$ and $R_2'$ have the same significance as in the abovementioned formula (I), in a manner which is in itself known. The hydrogenation is preferably carried out in the presence of ammonia and a hydrogenation catalyst such as Raney nickel or Raney cobalt.

The bis-($\beta$-cyanoethylhydantoins) of formula (II) used as starting substances in the process according to the invention are industrially conveniently accessible through the addition of acrylonitrile ("cyanoethylation") in the presence of a catalyst such as the example NaOH or KOH, to a bishydantoin of formula

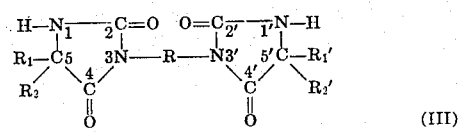

wherein R, $R_1$, $R_1'$, $R_2$ and $R_2'$ have the same significance as in formula (I). As bis(hydantoins) of formula (III) there may for example be mentioned: bis(5,5-demethylhydantoinyl-3) methane, 1,4-bis(5',5'-dimethylhydantoinyl-3')-butane, 1,2-bis(5',5'-dimethylhydantoinyl-3')-ethane, 1,12-bis(5',5'-dimethylhydantoinyl-3')-dodecane, 1,6-bis(5',5'-dimethylhydantoinyl-3')-hexane, $\beta,\beta'$-bis(5',5'(-dimethylhydantoinyl-3')-diethyl ether, 1,4-bis(5'-isopropylhydantoinyl-3')-butane, 1,4-bis(5'isopropylhydantoinyl-3')-butane, and 3,3'-tetramethylene-bis (1,3-diaza-spiro[4.5]decane-1-glycidyl-2,4-dione).

The bis(hydantoins) of formula (III) can be easily obtained in accordance with the process described in U.S. Pat. No. 3,296,208, by condensation of 1 mol of each of the two hydantoins of formulas

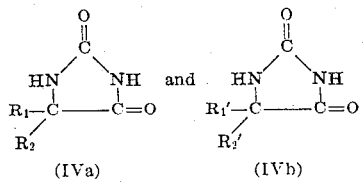

(IVa)  (IVb)

(IV a and IV b can be identical or different hydantoins) with 1 mol of a dihalide of formula

Hal - R - Hal  (V)

where Hal represents a halogen atom and R has the same significance as in formula (I), in the presence of 2 equivalents of alkali.

As hydantoins of formulas (IV a) or (IV b) there may for example be mentioned: hydantoin, 5-methyl-hydantoin, 5-ethyl-hydantoin, 5-propyl-hydantoin, 1,3-diazaspiro(4.4)nonane-2,4-dione, 1,3-diazaspiro(4.5)decane-2,4-dione, 5,5-diethyl-hydantoin, 5-methyl-5-ethyl-hydantoin and especially 5,5-dimethyl-hydantoin.

As dihalides of formula (V) there may be mentioned: methylene chloride, 1,2-dichlorethane, 1,2- or 1,3-dichloropropane, 1,2- or 1,3- or 1,4- or 2,3-dichlorobutane, 1,2- or 1,3- or 1,4- or 1,5- or 2,3- or 2,4-dichloropentane, the corresponding dichlorohexanes, -heptanes, -octanes, -nonanes, -decanes, -undecanes, -dodecanes, -hexadecanes, -octadecanes, 1,4-dichloro-2-butene, di-(2-chlorethyl)-formal, di-(2-chlorethyl)-ether, 1,4-dichloro-2-methylbutane, 1,3-dichloro-2-hydroxy-propane, 1,5-dichloro-2,2-dimethylpentane, di-(β-chlorethyl)-thioether, di-(β-chlorethyl)-ether, 1,2-, 1,3- or 1,4-dichlorocyclohexane, 4,4'-diclorodicyclohexylmethane, 4,4'-dichlorodicyclohexyldimethylmethane, 1,2-, 1,3- or 1,4-di-chloromethyl-benzene, 1,4-diiodobutane, 1,5-dibromopentane, 1,4-dibromo-2-butene, 1,8-dibromoctane, α,λ'-dibromo-o-, m- or p- xylene, glycol-bis-chloracetate and the bis-monochloracetates of lower polyglycols.

Preferably, the ωω'-bis-(5,5-dimethyl-hydantoinyl-3) derivatives of straight-chain hydrocarbons of the paraffin series are used as starting substances. The catalytic hydrogenation of the bis-(βcyanoethyl-hydantoins) of formula (II) appropriately takes place in the presence of a hydrogenation catalyst and of ammonia. The presence of ammonia largely suppresses the production of undesired by-products, such as secondary amines, condensed products and the like. Ammonia can for example be employed in the gaseous or liquid form or in the form of a solution in methanol, dioxan and other solvents. Raney nickel and Raney cobalt are particularly effective as hydrogenation catalysts. It is also possible to use a cobalt oxide catalyst on a suitable carrier material, this catalyst being reduced to cobalt metal catalyst in the stream of hydrogen.

The catalytic reduction is as a rule carried out by mixing the bis-(β-cyanoethylhydantoin) with the ammonia and catalyst and passing hydrogen gas into the reaction mixture. The hydrogenation can in principle be carried out at atmospheric pressure and room temperature, but elevated pressures of 50 atmospheres and above, as well as elevated reaction temperatures in the range of 50° to 150° C are preferred. The hydrogenation is continued until no further hydrogen is absorbed. After completion of the hydrogenation the catalyst is separated off, for example by filtration, and the ammonia and solvent are distilled off.

As mentioned initially, the new diamines of formula (I) represent valuable curing agents for epoxide resins.

The subject of the present invention are hence also curable mixtures which are suitable for the manufacture of mouldings, impregnations, coatings and adhesive bonds, and which are characterized in that they contain (a) a polyepoxide compound with an average of more than one epoxide group in the molecule; and (b) as the curing agent, a di-primary diamine containing two hydantoin rings, of formula (I).

Appropriately, 0.5 to 1.3 equivalents, preferably about 1.0 equivalent, of nitrogen-bonded active hydrogen atoms of the bis(γ-aminopropylhydantoin) of formula (I) are used per one equivalent of epoxide groups of the polyepoxide compound (a).

Possible polyepoxide compounds (a) are above all those with an average of more than one glycidyl group, β-methylglycidyl group or 2,3-epoxycyclopentyl group bonded to a hetero-atom (for example sulphur, preferably oxygen or nitrogen); the following may be mentioned especially: bis(2,3-epoxycyclopentyl)ether, diglycidyl ethers or polyglycidyl ethers of polyhydric aliphatic alcohols, such as 1,4-butanediol, or polyalkylene glycols, such as polypropylene glycols; diglycidyl ethers or polyglycidyl ethers of cycloaliphatic polyols, such as 2,2-bis-(4-hroxycyclohexyl)propane; diglycidyl ethers or polyglycidyl ethers of polyhydric phenols, such as resorcinol, bis-(p-hydroxyphenyl)methane, 2,2-bis(p-hydroxyphenyl)-propane (= diomethane), 2,2-bis(4'-hydroxy-3',5'-dibromophenyl)-propane, 1,1,2,2-tetrakis-(p-hydroxyphenyl)ethane, or of condensation products of phenols with formaldehyde obtained under acid conditions, such as phenol novolacs and cresol novolacs; di- and poly-(β-methylglycidyl)ethers of the above-mentioned polyhydric alcohols or polyhydric phenols; polyglycidyl esters of polybasic carboxylic acids, such as phthalic acid, terephthalic acid, 4-tetrahydrophthalic acid and hexahydrophthalic acid; N-glycidyl derivatives of amines, amides and heterocyclic nitrogen bases, such as N,N-diglycidyl-aniline, N,N-diglycidyl-toluidine, N,N,N',N'-tetraglycidyl-bis(p-amino-phenyl)-methane; triglycidyl-isocyanurate; N,N-diglycidyl-ethyleneurea; N,N'-diglycidyl-5,5-dimethyl-hydantoin, N,N'-diglycidyl-5-isopropyl-hydantoin; N,N'-diglycidyl-5,5-dimethyl-6-isopropyl-5,6-dihydro-uracil.

If desired, active diluents such as for example styrene oxide, butyl glycidyl ether, isooctyl glycidyl ether, phenylglycidyl ether, cresyl glycidyl ether or glycidyl esters of synthetic highly branched mainly tertiary aliphatic monocarboxylic acids ("CARDURA E") can be added to the polyepoxides in order to lower the viscosity.

The curing of the curable mixtures according to the invention to give mouldings and the like is appropriately carried out in the temperature range of 20° to 120° C, preferably at 30° to 60° C. The curing can, in a known manner, also be carried out in two or more stages, with the first curing stage being carried out at a lower temperature (for example about 40° C) and the post-curing at a higher temperature (for example 100° C).

The curing can, if desired, also be carried out in two stages by first prematurely stopping the curing reaction or carrying out the first stage at room temperature or at only slightly elevated temperature, whereupon a curable precondensate which is still fusible and soluble (a so-called "B-stage") is obtained from the epoxide component (a) and the amine curing agent (b). Such a precondensate can for example serve for the manufacture of "prepregs," compression moulding compositions or especially sintering powders.

In order to shorten the gelling times or cure times, known accelerators for curing with amines, for example monophenols or polyphenols, such as phenol or diomethane, salicylic acid, tertiary amines or salts of thiocyanic acid, such as NH$_4$SCN, can be added.

The term "curing" as used here denotes the conversion of the soluble, either liquid or fusible, polyepoxides into solid, insoluble and infusible, three-dimensional crosslinked products or materials, and in particular as a rule with simultaneous shaping to give mouldings, such as castings, pressings, laminates and the like or "two-dimensional structures" such as coatings, lacquer films or adhesive bonds.

The curable mixtures according to the invention from polyepoxide compounds (a) and bis(γ-aminopropylhydantoins) of formula (I) as curing agents can furthermore be mixed, in any stage before curing, with usual modifiers such as extenders, fillers and reinforcing agents, pigments, dyestuffs, organic solvents, plasticizers, flow control agents, agents for conferring thixotropy, flameproofing substances or mould release agents.

As extenders, reinforcing agents, fillers and pigments which can be employed in the curable mixtures according to the invention there may for example be mentioned: coal tar, bitumen, textile fibers, glass fibers, asbestos fibers, boron fibers, carbon fibers, cellulose, polyethylene powder, polypropylene powder; quartz powder; mineral silicates such as mica, asbestos powder or slate powder; kaolin, aluminum oxide trihydrate, chalk powder, gypsum, antimony trioxide, bentones, silica aerogel ("AEROSIL"), lithopone, baryte, titanium dioxide, carbon black, graphite, oxide colors such as iron oxide, or metal powders, such as aluminum powder or iron powder.

Suitable organic solvents for modifying the curable mixtures are for example toluene, xylene, n-propanol, butyl acetate, acetone, methyl ethyl ketone, diacetone-alcohol, ethylene glycol monomethyl ether, monoethyl ether and monobutyl ether.

Dibutyl, dioctyl and dinonyl phthalate, tricresyl phosphate, trixylenyl phosphate and also polypropylene glycols can be employed as plasticizers for modifying the curable mixtures.

Silicones, cellulose acetobutyrate, polyvinyl butyral, waxes, stearates and the like (which in part are also employed as mould release agents) can be added as flow control agents when employing the curable mixtures, especially in surface protection.

Especially for use in the lacquer field, the polyepoxide compounds can furthermore be partially esterified in a known manner with carboxylic acids, such as, especially, higher unsaturated fatty acids. It is furthermore possible to add other curable synthetic resins, for example phenoplasts or aminoplasts to such lacquer resin formulations.

The curable mixtures according to the invention can be manufactured in the usual manner with the aid of known mixing equipment (stirrers, kneaders, rolls and the like).

The curable epoxide resin mixtures according to the invention are above all employed in the fields of surface protection, the electrical industry, laminating processes and the building industry. They can be used, in a formulation suited in each case to the special end use, in the unfilled or filled state, optionally in the form of solutions or emulsions as paints, lacquers, as sintering powders, compression moulding compositions, injection moulding formulations, dipping resins, casting resins, impregnating resins, binders and adhesives, as tool resins, laminating resins, sealing and filling compositions, floor covering compositions and binders for mineral aggregates, In the examples which follow, unless otherwise stated, parts denote parts by weight and percentages denote percentages by weight. Parts by volume and parts by weight bear the relation of the milliliter to the gram.

The following epoxide resins were used for the manufacture of curable mixtures described in the examples:

EPOXIDE RESIN A

Polyglycidyl ether resin (commercial product) manufactured by condensation of diomethane (2,2-bis(p-hydroxyphenyl)-propane) with a stoichiometric excess of epichlorhydrin in the presence of alkali, consisting mainly of diomethane-diglycidyl ether of formula

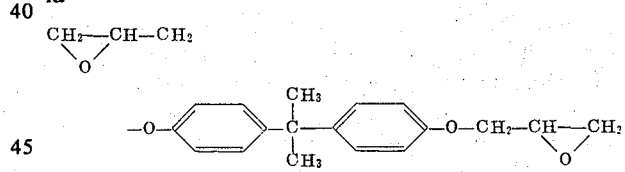

which is liquid at room temperature and has the following characteristics:
Epoxide content: 5.1 – 5.5 epoxide equivalents/kg
Viscosity (Hoeppler) at 25° C: 9,000 – 13,000 cP

EPOXIDE RESIN B

Liquid hexahydrophthalic acid diglycidyl ester (commercial product)
Epoxide content: 6.3 epoxide equivalents/kg
Viscosity (Hoeppler) at 25° C: 475 cP Epoxide RESIN C Polyglycidyl ether resin (commercial product) consisting mainly of the diglycidyl ether of 2,2-bis(4'-hydroxycyclohexyl)-propane of formula which is liquid at room temperature and has the following characteristics:
Epoxide content: 4.46 epoxide equivalents/kg
Viscosity (hoeppler) at 25° C: 2140 cP For determination of the mechanical and electrical properties of the curable mixtures described in the examples which follow, sheets of 135 × 135 × 4 mm were manufactured for determining the flexural strength, deflection, impact strength and water absorption. The test specimens (60 × 10 × 4 mm) for determining the water absorption and for the flexing test and impact test (VSM 77103 or 77105 respectively) were machined from the sheets.

Test specimens of dimensions 120 × 15 × 10 mm were in each case cast for determining the heat distortion point according to Martens (DIN 53,458). Sheets of dimensions 120 × 120 × 4 mm were cast for testing the arcing resistance and the tracking resistance (VDE 0303).

MANUFACTURING EXAMPLES

Example 1 a. A solution of 588 g of 1,6-bis-(5',5'-dimethylhydantoinyl-3')-n-hexane in 600 ml of dioxane is mixed at 110° C with 2 ml of 30 percent strength aqueous sodium hydroxide solution, whilst stirring. 194 g of acrylonitrile (3.65 mols) are added dropwise over the course of 20 minutes and the heating bath is removed. The temperature of the reaction mixture remains at 108° C and the pH is about 8. During the dropwise addition the acrylonitrile boils under reflux, and at the end of the dropwise addition practically all the acrylonitrile has reacted. The mixture is stirred for a further 20 minutes at 109° C and 1 liter of water is then added. A clear solution results, from which colorless crystals precipitate on slow cooling to 10° C. These are filtered off, rinsed with a little water and dried in vacuo at 60° C. 679 g (87.9 percent of theory) of 1,6-bis-(1'(β-cyanethyl)-5',5'-dimethyl-hydantoinyl-3')-n-hexane of melting point 109° to 114° C are obtained. The material is recrystallized from 600 g of methanol and 612 g of pure product of melting point 112.5°–113.8° C are obtained. Elementary analysis shows:

| Found | Calculated |
|---|---|
| 59.23 % C | 59.44 % C |
| 7.18 % C | 7.26 % H |
| 19.09 % N | 18.91 % N | b. 44.5 g of 1,6-bis-[1'-(β-cyanethyl)-5',5'-dimethylhydantoinyl-3']-n-hexane (0.1 mol) are mixed with 500 g of methanol, 50 g of ammonia gas and 5 g of Raney nickel and hydrogenated in 22 hours at 24° C in a duck-shaped shaking vessel, under normal pressure. The resulting solution is filtered to remove the nickel and is subsequently concentrated on a rotary evaporator until constant weight is reached (80° C/0.1 mm Hg). 45.2 g (100 percent of theory) of 1,6-bis-[1'-(γ-aminopropyl)-5',5'-dimethylhydantoinyl-3']-n-hexane of formula

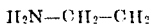

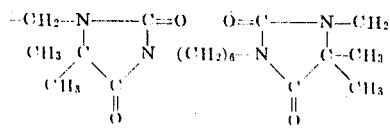

are obtained in the form of greenish crystals. The product has the following characteristics:
Melting point: 65 to 67° c
Amine group content: 4.06 equivalents/kg (corresponding to 91.8 percent of theory).

Example 2 a. A mixture of 269.93 g of β, β'-di-(5,5-dimethylhydantoinyl-3)-diethyl ether (0.828 mol) and 89,04 g of acrylonitrile (1.68 mols) is heated to 50° C and 1.2 ml of 30 percent strength aqueous sodium hydroxide solution are then added. The pasty reaction mixture is heated to 55° C whilst stirring, whereupon a strongly exothermic reaction begins; after removal of the heating bath, the temperature of the mixture further rises to 112° C. After about 15 minutes the reaction has ended; the mixture is stirred for a further 30 minutes at 95° C and the excess acrylonitrile is distilled off under a gradually increasing vacuum (62 mm Hg to 15 mm Hg). 3.6 g of acrylonitrile are thus recovered (theory 4.2 g).

354.3 g (99.1 percent yield) of β,β'-bis-[1-(2'-cyanethyl)5,5-dimethylhydantoinyl-3]-diethyl ether are obtained as a very viscous resin which is dark brown in color.

b. A mixture of 515 g of β,β'-bis-[1-(2'-cyanethyl)-5,5-dimethylhydantoinyl-3]-diethyl ether (1.19 mols), 660 ml of dioxane, 35 g of Raney nickel and 260 g of ammonia gas is hydrogenated in 6 hours at 100° C under 100 atmospheres hydrogen pressure. The reaction mixture is worked-up in accordance with example (1b) and 491.5 g (corresponding to 93.4 percent of theory) of β,β'-bis-[1-(3'-aminopropyl)-5,5-dimethyl-hydantoinyl-3]-diethyl ether of formula

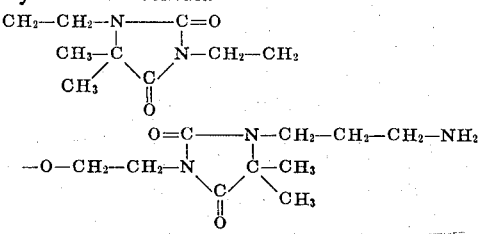

are obtained in the form of a yellowish viscous oil. The product has the following characteristics:
Viscosity (Hoeppler) at 25° C: 29,300 cP
Amine group content: 4.31 equivalents/kg (=95.6 percent of theory).

Example 3 a. 201 g (0.75 mol) of bis-(5,5-dimethylhydantoinyl-3)-methane are suspended in 240 ml of dimethylformamide in a stirred flask equipped with a reflux condenser, internal thermometer and dropping funnel, whilst stirring. After adding 0.6 ml of 10 N NaOH the suspension is first warmed to about 120° C internal temperature at a constant bath temperature of 142° C, after which the dropwise addition of a total of 84 g of acrylonitrile (1.6 mols) is started. During the dropwise addition the internal temperature rises to about 152° C. The reaction is allowed to continue for about a further hour, in the course of which the internal temperature drops to about 135° C. The solvent is now completely removed on a rotary evaporator, initially under a waterpump vacuum and at a bath temperature of 140° C and subsequently at about 0.1 mm Hg. After cooling, 283 g (101 percent of theory) of colorless crystals are obtained.

For purification this crude product was recrystallized from 1,400 ml of methanol. The melting point of the bis-[1-(β-cyanoethyl)-5,5-dimethylhydantoinyl-3]-methane is 139.4°C – 141.2°C.

Elementary analysis shows:

| Found | Calculated |
|---|---|
| 54.46 % C | 54.53 % C |
| 6.00 % H | 5.92 % H |
| 22.18 % N | 22.45 % N | b. 194 g (0.52 mol) of the recrystallized bis-[1-(β-cyano-ethyl)-5,5-dimethylhydantoinyl-3]-methane described above are suspended in 250 ml of isopropyl alcohol and hydrogenated, after addition of 20 g of Raney nickel, in a stirred autoclave in the presence of 60 g of ammonia gas, at a hydrogen pressure of 125 atmospheres at 100°C, over the course of about 6 hours.

The solution freed of catalysts by filtration is first completely concentrated on a rotary evaporator at about 80°C bath temperature and about 20 mm Hg. Remnants of volatile constituents which are still present are removed at the same bath temperature but at about 0.1 mm Hg.

191.5 g (96.4 percent of theory) of a bis-[1-(γ-aminopropyl)-5,5-dimethylhydantoinyl-3)-methane of formula

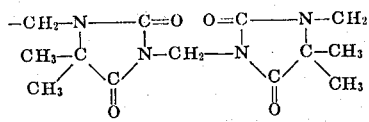

which is blue in color because of its slight nickel-amine complex content. According to the potentiometric titration of the aqueous solution with 1 N HCl, the product contains 4.95 NH₂ equivalents/kg (94.7 percent of theory).

Example 4 a. 84.4 g (0.2 mol) of 1,12-bis-(5',5'-dimethylhydantoinyl-3')-n-dodecane, dissolved in 50 ml of dimethylformamide, 0.2 ml of 10 N NaOH and 22.2 g (0.42 mol) of acrylonitrile are reacted in accordance with the procedure described in example (3a) and thereafter the reaction product is completely freed of dimethylformamide. 1.2 g (96.7 percent of theory) of a dark brown viscous liquid are obtained. For further purification, the product is dissolved in 100 ml of methyl ethyl ketone, filtered hot after addition of active charcoal, and freed of the solvent.

b. 86 g of the purified crude product of 1,12-bis-[1'-(β-cyanoethyl)-5',5'-dimethylhydantoinyl-3']-n-dodecane, obtained according to example (4a), are dissolved in 100 ml of isopropyl alcohol and hydrogenated over the course of about 6 hours in accordance with the procedure described in example (3b), in the presence of 9 g of Raney nickel and 45 g of ammonia gas; the mixture is then filtered and freed of volatile constituents. Since the product is evident inadequately hydrogenated according to the potentiometric titration, it is again hydrogenated under the same conditions.

After working-up according to example (3(b 78 g of 1,12-bis-[1'-(γ-aminopropyl)-5',5'-dimethylhydantoinyl-3']-n-dodecane of formula

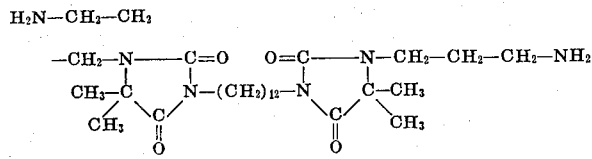

are obtained. According to the potentiometric titration it contains 3.48 NH₂-equivalents/kg (93.5 percent of theory).

Example 5 a. In accordance with the procedure described in example (3a), 84.6 g (0.25 mol) of 1,4-bis-(5'-isopropylhydantoinyl-3')-n-butane are dissolved in 110 ml of dimethylformamide and reacted with 28.1 g (0.53 mol) of acrylonitrile in the presence of 0.2 ml of 10 N NaOH. Following the post-reaction, 0.2 g of active charcoal are added to the reaction mixture; it is then filtered and the dimethylformamide is completely removed under reduced pressure. 110 g of a dark brown viscous liquid are obtained, corresponding to a yield of 100 percent of theory.

b. 102 g of 1,4-bis-[1'-(β-cyanoethyl)-5'-isopropyl-hydantoinyl-3'-]-n-butane are dissolved in 100 ml of isopropyl alcohol and hydrogenated in accordance with the procedure indicated in example (3b), in the presence of 10 g of Raney nickel and 60 g of ammonia gas. As found at the end of the working-up, the hydrogenation is inadequate and for this reason the entire hydrogenation process is repeated on the recovered, only partially hydrogenated, product. After working-up according to example (3b), 88 g (84.5 percent of theory) of 1,4-bis-[1'-(γ-aminopropyl)-5'-isopropylhydantoinyl-3']-n-butane of formula

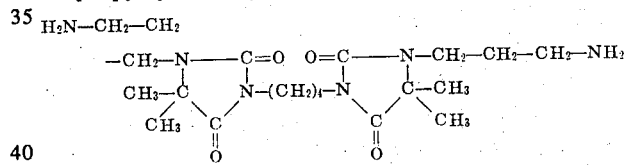

are obtained in the form of a brown highly viscous oil which according to the potentiometric titration contains 4 NH₂-equivalents/kg (90 percent of theory).

USE EXAMPLES

Example I 100 g of epoxide resin A (liquid diomethane-diglycidyl ether having an epoxide content of 5.25 epoxide equivalents/kg and a viscosity at 25°C of about 9500 CP) are homogeneously mixed at 40°C with 59 g of 1,6-bis-[1'(γ-aminopropyl)-5',5'-dimethylhydantoinyl-3']-n-hexane according to example 1, having an amine group content of 4.06 equivalents/kg (corresponding to a ratio of equivalents of epoxide groups to equivalents of nitrogen-bonded active hydrogen atoms = approx. 1:1), and the resulting mixture (sample A) is poured into aluminum moulds (135 × 135 × 4 mm) prewarmed to 40°C and subjected to the following curing cycle: 24 hours, 40°C + 6 hours, 100°C.

For comparison, a known curable mixture is manufactured from 100 g of expoxide resin A and 29 g of 2-methyl-3,3-bis-(γ-aminopropyl)-3,4,5,6-tetrahydropyrimidine (sample B). This comparison mixture is cured analogously to the sample A₁ according to the invention, for 24 hours at 40°C and then for 6 hours at 100°C.

Table I below quotes the properties of castings obtained with the sample A according to the invention and the known sample B:

TABLE I

|  | Sample A | Sample B |
|---|---|---|
| g of Amine Curing agent per 100 g of Epoxide Resin A | 59.0 | 29 |
| Flexural strength VSM 77,103 (kg/mm$^2$) | 10.8 | 12.0 |
| Deflection VSM 77,103 (mm) | >20 | 10 |
| Impact strength VSM 77,105 (cmkg/cm$^2$) | >25 | 14 |
| Water absorption 4 days, 20°C (%) | 0.37 | 0.35 |

This experiment shows that the test specimens from sample A according to the invention possess a higher impact strength and deflection than the test specimens obtained under analogous curing conditions from the known sample B.

EXAMPLE II 100 g of epoxide resin A are homogeneously mixed at 40° C with 55.5 g of β, β'-bis-[1-(3'-aminopropyl)-5,5-dimethyl-hydantoinyl-3]-diethyl ether and the resulting mixture (sample C) is cast into aluminum moulds (135 × 135 × 4 mm) warmed to 40° C. Curing takes place for 24 hours at 40° C. The properties of the castings can be seen from Table II below:

TABLE II

|  | Sample C |
|---|---|
| g of Amine Curing Agent per 100 g of Epoxide Resin A | 55.5 |
| Flexural strength (VSM 77,103) | 12.2 kg/mm$^2$ |
| Deflection (VSM 77,103) | >17.8 mm |
| Impact strength (VSM 77,105) | 16.8 cmkg/m$^2$ |
| Heat distortion point according to Martens (DIN 53,453) | 59°C |
| Water absorption 4 days, 20°C | 0.39% |

COMPARISON EXPERIMENT

For comparison, samples D, E, F and G were prepared, in each case mixing 100 g of the liquid epoxide resin A used in example II (bisphenol-A-polyglycidyl ether resin with an epoxide content of 5.35 epoxide equivalents/kg) with the equivalent amounts given below in Table III of triethylenetetramine (sample D), 1,6-hexamethylenediamene (sample E), bis-(4-amino-3-methyl-cyclohexyl)-methane (sample F) and 1-(2'-aminoethyl)-piperazine (sample G) at 40° C. The mixtures were cured for 24 hours at 40° C analogously to sample C according to example II, and the properties of the castings were determined.

The results can be seen from Table III below:

TABLE III

| Diamine | Sample D (Triethylenetetramine) | Sample E (Hexamethylenediamine) | Sample F (Bis-(4-amino-3-methylcyclohexyl)methane) | Sample G (1-(2'-aminoethyl)-piperazine) |
|---|---|---|---|---|
| Grams of amine curing agent per 100 g. of enoxide resin A. | 10 | 15 | 33 | 23 |
| Flexural strength VSM (mg./mm.$^2$). | 10.9 | 12.0 | Brittle, not machinable. | Brittle, not machinable. |
| Deflection VSM (mm.) | 4.4 | 10.5 |  |  |
| Impact strength VSM (cmkg./cm.$^2$). | 6.9 | 8.8 |  |  |
| Heat distortion point according to Martens DIN (°C.). | 60 | 67 |  |  |
| Water absorption 4 days, 20° C. (percent). | 0.21 | 0.29 |  |  |

The amount of amine curing agent in samples D to G in each case corresponds to one equivalent of nitrogen-bonded hydrogen atoms per one epoxide equivalent of the epoxide resin.

The experimental results show that the test specimens cured at 40° C from sample C according to the invention possess considerably better mechanical properties than the test specimens obtained under the same curing conditions from samples D, E, F and G according to the state of the art.

Example III 100 g of epoxide resin A at a time were homogeneously mixed at 40° C with 51.3 g of bis-[1-(γ-aminopropyl)-5,5-dimethyl-hydantoinyl-3]-methane and with 73.5 g of 1,12-bis-[1'-(γ-aminopropyl)-5',5'-dimethylhydantoinyl-3']-n-dodecane respectively and the resulting mixtures were poured into prewarmed aluminum moulds (135 × 135 × 4 mm) analogously to example I.

The mixtures were in each case cured for 24 hours at 40° C and post-cured for 6 hours at 100° C. Test specimens of dimensions 60 × 10 × 4 mm for determining the flexural strength, deflection, impact strength and water absorption were manufactured from the sheets of the cured shaped material thus obtained.

The properties of these test specimens can be seen from Table IV below.

TABLE IV

| Diamine | Bis[1-(γ-aminopropyl)-5,5-dimethylhydantoinyl-3]-methane | 1,12-Bis-[1'-(γ-aminopropyl)-5''-dimethylhydantoinyl-3']-n-doecane |
|---|---|---|
| g of Amine Curing Agent per 100 g of Epoxide Resin A | 51.3 | 73.5 |
| Curing conditions | 24 hours at 40°C | + 6 hours at 100°C |
| Flexural strength (VSM 77,103) | 14.5 kg/mm$^2$ | 9.6 kg/mm$^2$ |
| Deflection (VSM 77,103) | 11.0 mm | >15 mm |
| Impact strength (VSM 77,105) | 42.9 cmkg/cm$^2$ | 57.9 cmkg/cm$^2$ |
| Weight increase after storage in water (4 days at 20°C | 0.41 % | 0.42 % |

Example IV 10 g of epoxide resin A were carefully mixed with 6.4 g of 1,4-bis-[1'-(γ-aminopropyl)-5'-isopropyl-hydantoinyl-3]-n-butane and spread on the ends, previously roughened by grinding and degreased by washing with acetone, of test strips of an aluminum alloy (registered trade name "Anticorodal B") of dimensions 170 × 25 × 1.5 mm. Two of these test strips at a time were so lined up by means of a gauge that the ends spread with the resin-curing agent mixture overlap by 10 mm, and were then fixed in this position by means of a hose clip.

The resin-curing agent mixture here used as the adhesive was cured for 24 hours at 40° C and post-cured for 6 hours at 100° C. The test specimens were then cooled to room temperature and the tensile shear strength of the adhesive bond was determined in the tensile test. A tensile shear strength of 0.89 kg/mm² was obtained as the mean value from three determinations.

Example V

Three different bis-[1-(γ-aminopropyl)-hydantoinyl-3]-alkanes were used as curing agents for epoxide resin B (liquid hexahydrophthalic acid diglycidyl ester with an epoxide content of 6.3 epoxide equivalents/kg and a viscosity at 25° C of 475 cP).

The diamines indicated in the table below were in each case carefully mixed with epoxide resin B in the mixing ratio indicated. A part of the mixture was spread on the ends, previously roughened by grinding and cleaned by washing with acetone, of test strips of an aluminum alloy (registered trade name "Anticorodal B") of dimensions 170 × 25 × 1.5 mm. Two of these test strips at a time were so lined up by means of a gauge that the ends spread with the resin-curing agent mixture overlap by 10 mm, and were then fixed in this position by means of a hose clip. The resin-curing agent mixture here used as the adhesive was cured for 24 hours at 40° C and postcured for 6 hours at 100° C. The test specimens were then cooled to room temperature and the shear strength of the adhesive bond was determined in the tensile test (mean value of three tests).

The remainder of the resin-curing agent mixture was spread on aluminum sheets of dimensions 150 × 70 × 0.8 mm and the thin layer coating thus obtained was also cured for 24 hours at 40° C + 6 hours at 100° C. After curing the coating was tested for scratch resistance, tackiness after wiping over with an acetone-soaked cottonwool pad and resistance towards bending of the substrate.

The results of the individual tests are summarized in Table V below:

TABLE V

| Diamine | Bis-[1-(γ-aminopropyl)-5,5-dimethylhydantoinyl-3]-methane | 1,4-bis-[1'-(γ-aminopropyl)-5'-isopropylhydantoinyl-3']-n-butane | 1,12-bis-[1'-(γ-aminopropyl)-5',5'-dimethylhydantoinyl-3']-n-dodecane |
|---|---|---|---|
| Grams of amine curing agent per 10 g. of epoxide resin B. | 6.2 | 7.75 | 8.9 |
| Curing conditions | | 24 hours at 40° C. plus 6 hours at 100° C. | |
| Tensile shear strength on "Anticorodal B". | 1.01 kg./mm² | 0.64 kg./mm² | 1.11 kg./mm² |
| Assessment of the cured coating. | Scratch-resistant coating which after treatment with an acetone-soaked cottonwool pad no longer becomes tacky. Withstands repeated bending of the metal sheet without tearing or flaking off. | Scratch-resistant but somewhat brittle coating. No longer becomes tacky after treatment with an acetone-soaked cottonwool pad. | Scratch-resistant coating which after treatment with an acetone-soaked cottonwool pad no longer becomes tacky and also withstands repeated bending of the sheet metal substrate. |

Example VI

Curable mixtures with three different bis-[1-(γ-amino-propyl)-hydantoinyl-3]-alkanes were manufactured as in example V, but with the difference that instead of epoxide resin B, epoxide resin C (liquid diglycidyl ether of 2,2-bis-(4'-hydroxycyclohexyl)-propane with an epoxide content of 4.46 epoxide equivalents/kg and a viscosity of 2,140 cP) was used.

The mixing ratios and curing conditions employed, and the resulting tensile shear strength values of the test specimens (mean of three determinations) and the assessment of the coating (curing as a thin layer) are summarized in Table VI below.

TABLE VI

| Diamine | Bis-[1-(γ-aminopropyl)-5,5-dimethylhydantoinyl-3]-methane | 1,4-bis-[1'-(γ-aminopropyl)-5'-isopropylhydantoinyl-3']-n-butane | 1,12-bis-[1'-(γ-aminopropyl)-5',5'-dimethylhydantoinyl-3']-n-dodecane |
|---|---|---|---|
| Gram of amine curing agent per 10 g. of epoxide resin C. | 4.35 | 5.45 | 6.25 |
| Curing conditions | | 24 hours at 40° C. plus 6 hours at 100° C. | |
| Tensile shear strength on "Anticorodal B" | 1.44 kg./mm² | 1.17 kg./mm² | 1.50 kg./mm² |
| Assessment of the cured coating. | Scratch-resistant, somewhat brittle coating. No longer becomes tacky after treatment with an acetone-soaked cottonwool pad. | Scratch-resistant, somewhat brittle coating. Is easily swollen by the acetone wiping test. | Scratch-resistant coating which after repeated bending of the sheet metal substrate neither tears nor flakes off. No longer becomes tacky after treatment with an acetone-soaked cottonwool pad. |

We claim:

1. A curable composition of matter, which comprises (a) a 1,2 polyepoxide compound having an average of more than one epoxide group in the molecule and (b) as the curing agent, a di-primary diamine containing two hydantoin rings, of formula I

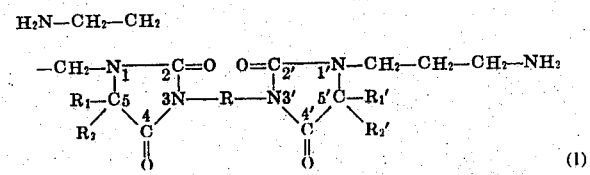

(I)

wherein R is straight or branched chain alkylene of from one to 18 carbon atoms which may be interrupted by a hetero ether atom, wherein $R_1$, $R_1'$, $R_2$ and $R_2'$ is each hydrogen, alkyl of one to four carbon atoms, or wherein $R_1$ and $R_2$ or $R_1'$ and $R_2'$ together are tetramethylene or pentamethylene.

* * * * *